3,598,608
CONCENTRATION OF TEA
Neophytos Ganiaris, Riverdale, N.Y., assignor to
Struthers Scientific and International Corporation
Filed July 6, 1967, Ser. No. 651,615
Claims priority, application Great Britain, July 15, 1966,
31,830/66
Int. Cl. A23f 3/00
U.S. Cl. 99—77                                                6 Claims

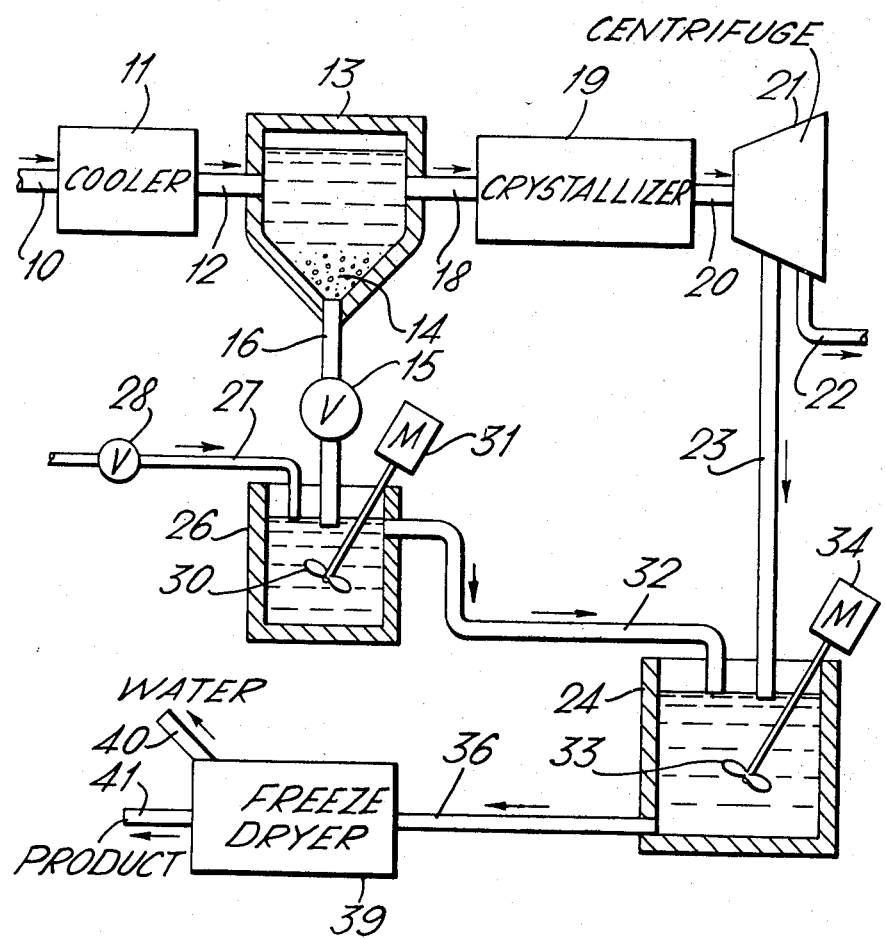

ABSTRACT OF THE DISCLOSURE

In the freeze concentration of tea, the tea solution is cooled to near freezing to precipitate "cream" of tea, the tea solution is freeze concentrated, the precipitate is dissolved in a small amount of hot water, the dissolved precipitate is mixed with the freeze concentrated tea solution, and the mixture is freeze dried.

BACKGROUND OF THE INVENTION

During the freeze concentration of tea solutions, large quantities of solids, known as "cream" of tea, precipitate as the tea solution is brought down to the freezing point. This precipitate is unavoidably removed with the ice in the freeze concentration of tea. This is undesirable as this precipitate is a valuable constituent of the tea which loses flavor and taste without it.

SUMMARY OF THE INVENTION

This invention cools a tea solution, separates the low temperature precipitates from the tea solution, mixes these precipitates with hot water to dissolve them, freeze concentrates the tea solution, and mixes the dissolved precipitates and hot water with the concentrated tea solution. The resulting concentrated tea solution, which has lost none of its solids content, may then be freeze dried.

Thus, this invention provides a process for the freeze concentration of tea solution in which there is no loss of flavor in the concentrated tea solution.

BRIEF DESCRIPTION OF THE DRAWING

This invention will be understood from the following description and accompanying drawing wherein:

The figure is a schematic representation of apparatus which may be used to practice this invention.

DESCRIPTION OF THE PREFERRED EMBODIMENT

Referring to the drawing in detail, an aqueous 5% to to 10% solution of tea solids at a temperature of about 75° F. enters the system through feed pipe 10 to pass into cooler 11. In cooler 11, the tea solution is cooled to between 32° and 35° F. and then is passed through pipe 12 into the precipitate separator 13. During residence of the cold tea solution in separator 13, "cream" of tea 14 precipitates out of the cold solution to be withdrawn through pipe 16. Valve 15, which is set according to the rate of feed through pipe 10, ensures that pipe 16 drains mostly precipitate 14.

Cold tea cleared of precipitate 14 passes through pipe 18 into crystallizer 19 in which ice crystals are grown in the tea solution to concentrate it. A slurry of ice crystals and tea solution pass through pipe 20 into a centrifuge 21 or an equivalent piece of apparatus where ice crystals are separated to pass from the system through pipe 22. Tea solution at a concentration of 36% to 40% at a temperature of about 26 degrees F. passes from centrifuge 21 through pipe 23 into mixing tank 24.

Precipitates from pipe 16 flow into tank 26 into which a small flow of water at about 120° F. is introduced through pipe 27. This small flow of water may be metered by a valve 28. An agitator 30 driven by motor 31 dissolves the precipitate in the hot water which flows as a solution through pipe 32 into tank 24. Agitator 33 driven by motor 34 mixes the dissolved solution of precipitates with the 36% to 40% solution of tea solids at about 26° F. This mixed and reconstituted solution leaves tank 24 through pipe 36 as a 30% to 35% solution of tea solids at a temperature of from 35° to 40° F. This solution may then be freeze dried in freeze dryer 39. Water is removed from freeze dryer 39 through pipe 40 and the product, which may be instant tea, through pipe 41.

While this invention has been shown and described in the best form known, it will nevertheless be understood that this is purely examplary and that modifications may be made without departing from the spirit of the invention except as it may be more limited in the appended claims.

What is claimed is:
1. In the process of concentrating tea solution and preserving unchanged all the solid flavour elements thereof, the steps of:
 (a) cooling the tea solution to 32° to 35° F.;
 (b) allowing precipitates to form and settle in the cooled tea solution;
 (c) drawing off the precipitates with a small amount of the tea solution;
 (d) further cooling the cooled tea solution to grow ice therein and further concentrate the tea solution;
 (e) separating the ice from the concentrated tea solution;
 (f) dissolving the tea precipitates in hot water; and
 (g) adding the dissolved precipitates to the concentrated tea solution and drying the resulting mixture.
2. The process according to claim 1 with the additional step of:
 (h) freeze drying the resulting mixture.
3. The process according to claim 2 wherein in step (a) the tea solution contains between 5% and 10% tea solids.
4. The process according to claim 3 wherein in step (d) the tea solution is concentrated to contain between 36% and 40% tea solids.
5. The process according to claim 4 wherein in step (f) the precipitates are dissolved in hot water at a temperature over 120° F.
6. The process according to claim 5 wherein in step (e) the concentrated tea solution separated from the ice is below 25° F. and wherein in step (g) the resulting mixture is at a temperature from 35° to 40° F.

References Cited

UNITED STATES PATENTS

| | | | |
|---|---|---|---|
| 3,151,985 | 10/1964 | Fobes | 99—77 |
| 3,381,302 | 4/1968 | Reimus et al. | 99—77X |
| 3,404,007 | 10/1968 | Muller | 99—77X |

A. LOUIS MONACELL, Primary Examiner

J. R. HOFFMAN, Assistant Examiner